United States Patent
Krishnamurthy et al.

(10) Patent No.: US 11,555,963 B1
(45) Date of Patent: Jan. 17, 2023

(54) OPTICAL POWER SPLITTERS WITH A TAILORED SPLITTING RATIO

(71) Applicant: GLOBALFOUNDRIES U.S. Inc., Malta, NY (US)

(72) Inventors: Subramanian Krishnamurthy, Ballston Lake, NY (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 6 days.

(21) Appl. No.: 17/358,255

(22) Filed: Jun. 25, 2021

(51) Int. Cl.
*G02B 6/125* (2006.01)
*G02B 6/13* (2006.01)
*G02B 6/122* (2006.01)
*G02B 6/12* (2006.01)

(52) U.S. Cl.
CPC .......... *G02B 6/125* (2013.01); *G02B 6/1228* (2013.01); *G02B 6/13* (2013.01); *G02B 2006/1215* (2013.01); *G02B 2006/12061* (2013.01)

(58) Field of Classification Search
CPC .................. G02B 6/125; G02B 2006/1215
See application file for complete search history.

(56) References Cited

U.S. PATENT DOCUMENTS 5,586,209 A * 12/1996 Matsuura ............. G02B 6/2808
385/132

5,818,989 A * 10/1998 Nakamura ............. G02B 6/125
385/39
5,923,801 A * 7/1999 Frank ..................... G02B 6/125
385/50

(Continued)

FOREIGN PATENT DOCUMENTS

| CN | 106405733 A | * | 2/2017 |
| JP | 2018-28566 A | * | 2/2018 |
| KR | 10-1844987 A | * | 4/2018 |

OTHER PUBLICATIONS

R. Baets et al. Silicon photonics: silicon nitride versus silicon-on-insulator. Optical Fiber Communication Conference, OSA Technical Digest (online) (Optica Publishing Group, 2016), paper Th3J.1, https://doi.org/10.1364/OFC.2016.Th3J.1, Mar. 2016. (Year: 2016).*

(Continued)

*Primary Examiner* — Michael Stahl
(74) *Attorney, Agent, or Firm* — Thompson Hine LLP; Anthony Canale

(57) ABSTRACT

Structures for an optical power splitter and methods of forming a structure for an optical power splitter. The structure includes a first waveguide core having a first arm, a second waveguide core including a second arm, and a third waveguide core having a third arm laterally positioned between the first arm and the second arm. The third arm has a longitudinal axis. The first arm is longitudinally offset from the third arm parallel to the longitudinal axis such that the third arm and the first arm are laterally adjacent over a first overlap distance. The second arm is longitudinally offset from the third arm parallel to the longitudinal axis such that the third arm and the second arm are laterally adjacent over a second overlap distance. The first overlap distance is greater than the second overlap distance to provide an overlap offset.

20 Claims, 4 Drawing Sheets

(56) References Cited

U.S. PATENT DOCUMENTS

| | | | |
|---|---|---|---|
| 6,201,913 B1* | 3/2001 | Yi | G02B 6/2804 385/48 |
| 2004/0218868 A1* | 11/2004 | Liu | G02F 1/225 385/45 |
| 2009/0162014 A1* | 6/2009 | Shiraishi | G02B 6/29352 385/45 |
| 2012/0224820 A1* | 9/2012 | Onishi | G02B 6/305 385/131 |
| 2022/0091335 A1* | 3/2022 | Bian | G02B 6/125 |

OTHER PUBLICATIONS

Liangshun Han, Bill P.-P. Kuo, Nikola Alic, and Stojan Radic, "Ultra-broadband multimode 3dB optical power splitter using an adiabatic coupler and a Y-branch," Opt. Express 26, 14800-14809 (2018).

Nguyen, Vinh H.; Kim, In K.; Seok, Tae J. 2020. "Low-Loss and Broadband Silicon Photonic 3-dB Power Splitter with Enhanced Coupling of Shallow-Etched Rib Waveguides" Appl. Sci. 10, No. 13: 4507.

Y. Bian, et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

M. Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest Optical Society of America, 2020), paper T3H.3.

J. X. B. Sia et al., "Mid-Infrared, Ultra-Broadband, Low-Loss, Compact Arbitrary Power Splitter Based on Adiabatic Mode Evolution," in IEEE Photonics Journal, vol. 11, No. 2, pp. 1-11, Apr. 2019, Art No. 6601111.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Junbo Zhu, et al., "Compact, broadband, and low-loss silicon photonic arbitrary ratio power splitter using adiabatic taper," Appl. Opt. 60, 413-416 (2021).

Bian et al., "Monolithically Integrated Silicon Nitride Platform" OFC Jun. 10, 2021.

* cited by examiner

US 11,555,963 B1

OPTICAL POWER SPLITTERS WITH A TAILORED SPLITTING RATIO

BACKGROUND

The present invention relates to photonics chips and, more specifically, to structures for an optical power splitter and methods of forming a structure for an optical power splitter.

Photonics chips are used in many applications and systems, such as data communication systems and data computation systems. A photonics chip integrates optical components, such as waveguides, optical switches, optical power splitters, and directional couplers, and electronic components, such as field-effect transistors, into a unified platform. Among other factors, layout area, cost, and operational overhead may be reduced by the integration of both types of components on the same chip.

An optical power splitter is an optical component that is used in photonics chips to divide optical power between multiple output waveguides. The same structure may be used as an optical power combiner that combines optical power received from multiple input waveguides. Conventional optical power splitters may be intolerant to dimensional inaccuracies produced by fabrication variations. The result is variability in the splitting ratio among different fabricated instances of the optical power splitter, which may lead to unpredictable performance.

Improved structures for an optical power splitter and methods of forming a structure for an optical power splitter are needed.

SUMMARY

In an embodiment of the invention, a structure includes a first waveguide core having a first arm, a second waveguide core including a second arm, and a third waveguide core having a third arm laterally positioned between the first arm and the second arm. The third arm has a longitudinal axis. The first arm is longitudinally offset from the third arm parallel to the longitudinal axis such that the third arm and the first arm are laterally adjacent over a first overlap distance. The second arm is longitudinally offset from the third arm parallel to the longitudinal axis such that the third arm and the second arm are laterally adjacent over a second overlap distance. The first overlap distance is greater than the second overlap distance to provide an overlap offset.

In an embodiment of the invention, a method includes forming a first waveguide core including a first arm having a first longitudinal axis, a second waveguide core including a second arm having a second longitudinal axis, and a third waveguide core including a third arm laterally positioned between the first arm and the second arm. The third arm has a longitudinal axis. The first arm is longitudinally offset from the third arm parallel to the longitudinal axis such that the third arm and the first arm are laterally adjacent over a first overlap distance. The second arm is longitudinally offset from the third arm parallel to the longitudinal axis such that the third arm and the second arm are laterally adjacent over a second overlap distance. The first overlap distance is greater than the second overlap distance to provide an overlap offset.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
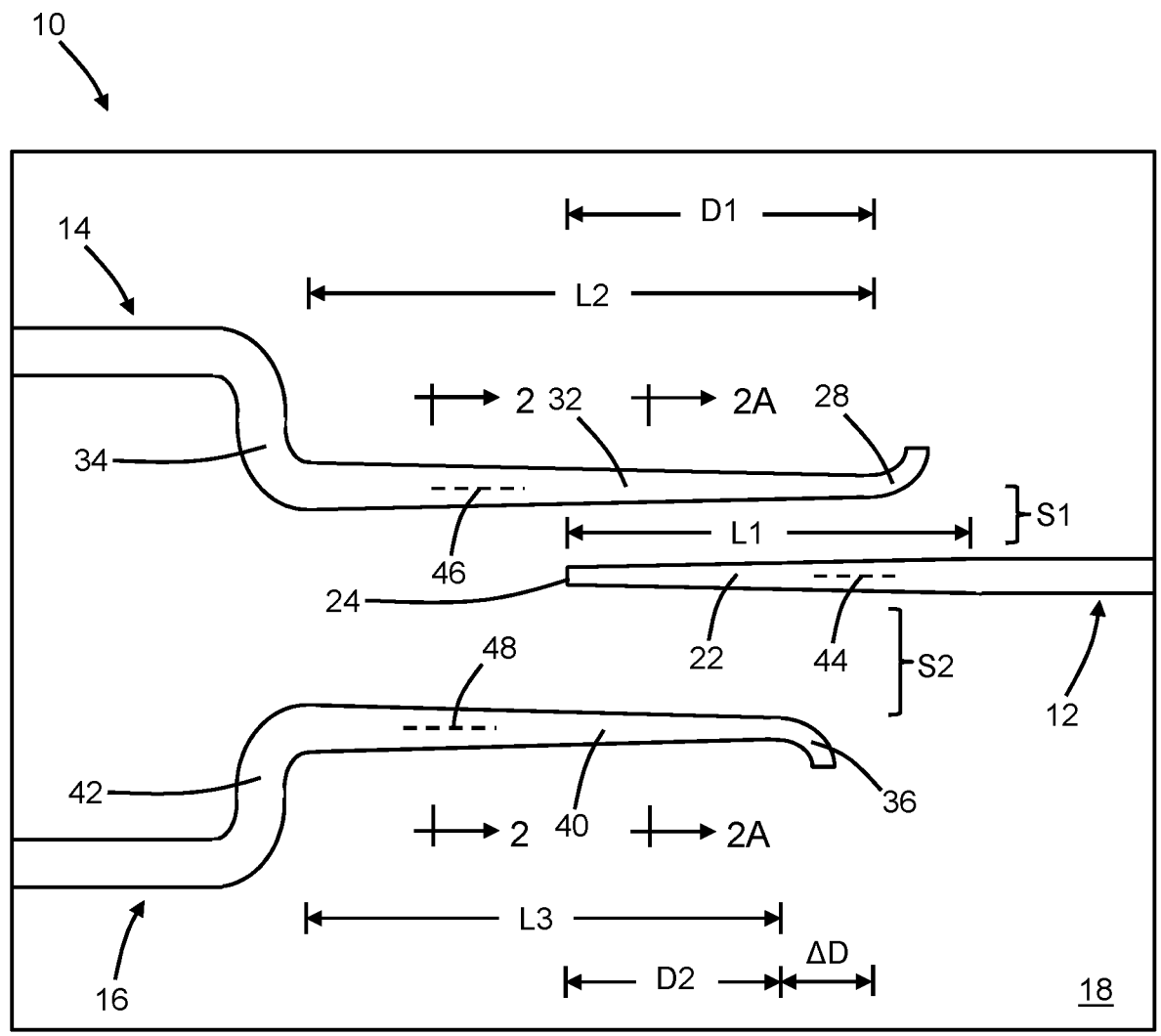
FIG. 1 is a top view of a structure at an initial fabrication stage of a processing method in accordance with embodiments of the invention.
Figure 2:
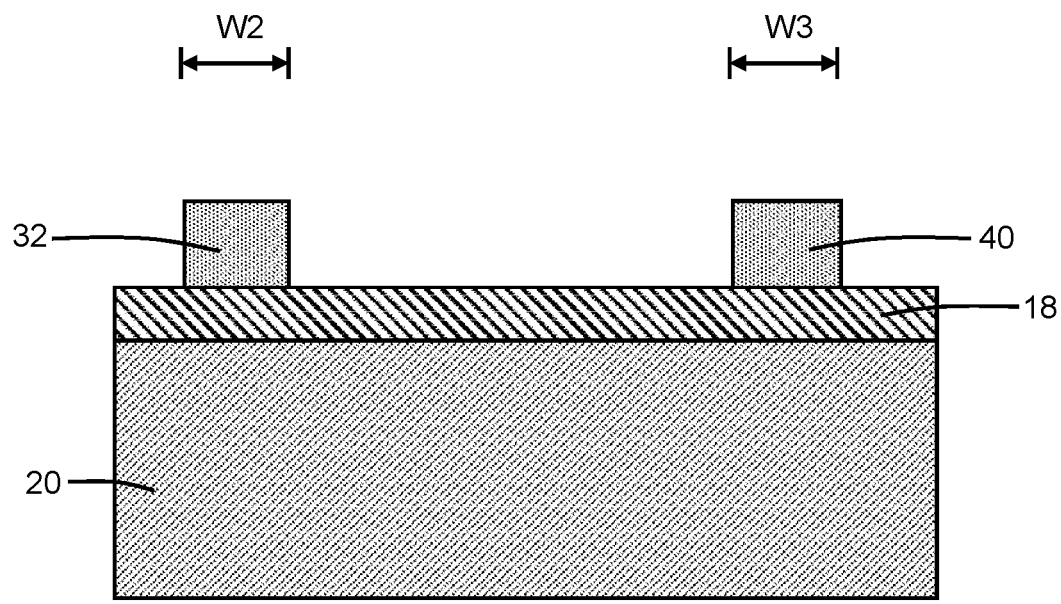
FIG. 2 is a cross-sectional view taken generally along line 2-2 in FIG. 1.
Figure 2A:
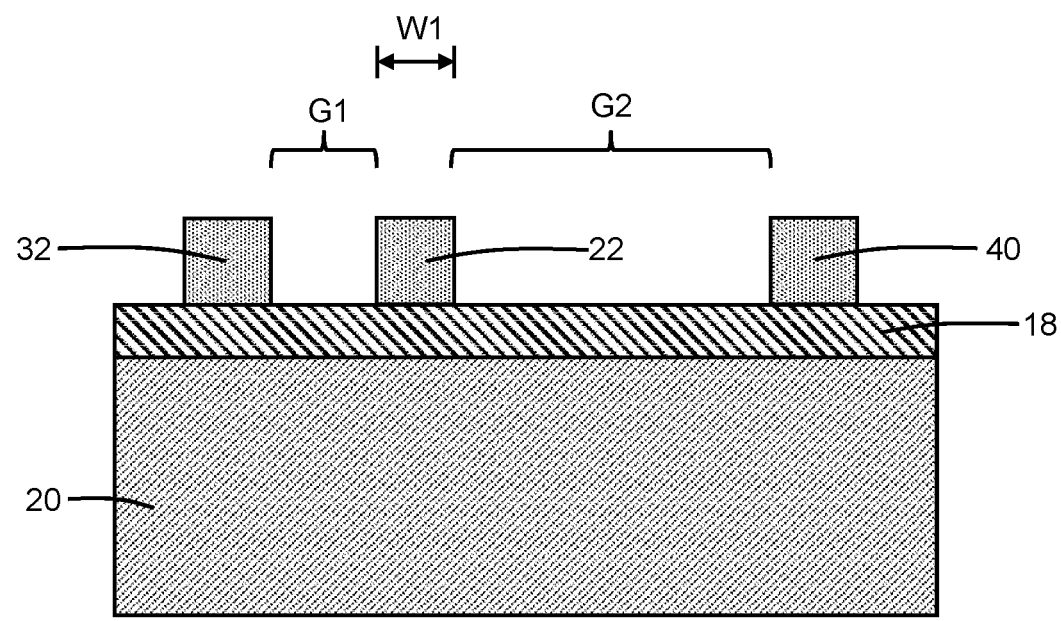
FIG. 2A is a cross-sectional view taken generally along line 2A-2A in FIG. 1.

With reference to FIGS. 1, 2, 2A and in accordance with embodiments of the invention, a structure 10 for an optical power splitter includes a waveguide core 12, a waveguide core 14, and a waveguide core 16. The waveguide cores 12, 14, 16 may be positioned on a dielectric layer 18. In an embodiment, the waveguide cores 12, 14, 16 may be comprised of a semiconductor material, such as single-crystal silicon. In an embodiment, the semiconductor material may originate from a device layer of a silicon-on-insulator (SOI) substrate that further includes a buried oxide layer providing the dielectric layer 18 and a substrate 20 comprised of a semiconductor material, such as single-crystal silicon. The waveguide cores 12, 14, 16 may be formed by patterning the device layer with lithography and etching processes during front-end-of-line processing. The device layer of the silicon-on-insulator wafer may be fully etched to define ridge waveguides as shown or, alternatively, only partially etched near the waveguide cores 12, 14, 16 to define rib waveguides. In an alternative embodiment, the waveguide cores 12, 14, 16 may be comprised of a different material, such as a dielectric material (e.g., silicon nitride), that is deposited and patterned.

The waveguide core 12 includes an arm 22 that terminates at an end 24. In an embodiment, the arm 22 may comprise a tapered section that narrows in width dimension W1 with decreasing distance from the terminating end 24. In an embodiment, the arm 22 of the waveguide core 12 may provide an input to the structure 10.

The waveguide core 14 includes an arm 32 and a set of bends 34 that reroute the waveguide core 14 to increase the spacing of the waveguide core 14 relative to the waveguide core 16 on the output side of the structure 10. In an embodiment, the waveguide core 14 may terminate at a curved feature provided by a bend 28 that is connected to, and extends to, the arm 32 on the input side of the structure 10. In an embodiment, the arm 32 may be a tapered section that increases in width dimension W2 with increasing distance from the transition to the bend 28 to the transition to the set of bends 34.

The waveguide core 16 includes an arm 40 and a set of bends 42 that reroute the waveguide core 16 to increase the spacing of the waveguide core 16 relative to the waveguide core 14 on the output side of the structure 10. In an embodiment, the waveguide core 16 may terminate at a curved feature provided by a bend 36 that is connected to, and extends to, the arm 40 on the input side of the structure 10. In an embodiment, the arm 40 may be a tapered section that increases in width dimension W3 with increasing distance from the transition to the bend 36 to the transition to the set of bends 42.

The arm 32 and the arm 40 may taper in an opposite direction from the arm 22. The respective width dimensions W1, W2, W3 may range from the ground rule minimum to about six hundred (600) nanometers, and may vary lengthwise linearly or, alternatively, nonlinearly according to a parametric curve. In embodiments, the width dimensions W1, W2, W3 may differ among the arms 22, 32, 40 and/or may asymmetrically change with position. In an alternative embodiment, the bend 28 and the bend 36 may be omitted from the structure 10 on its input side.

The arm 22 of the waveguide core 12 is laterally positioned between the arm 32 of the waveguide core 14 and the arm 40 of the waveguide core 16. The arm 22 of the waveguide core 12 may have a longitudinal axis 44. The arm 32 of the waveguide core 14 may have a longitudinal axis 46, which may be aligned parallel to the longitudinal axis 44. Similarly, the arm 40 of the waveguide core 16 may have a longitudinal axis 48, which may also be aligned parallel to the longitudinal axis 44. The arm 22 has a length L1, the arm 32 has a length L2, and the arm 40 has a length L3. In an embodiment, the length of the arm 40 is less than the length of the arm 32. In an embodiment, the respective lengths L1, L2, L3 may range from about five (5) micrometers to about one hundred (100) micrometers.

The arm 32 of the waveguide core 14 is longitudinally offset from the arm 22 of the waveguide core 12 parallel to the longitudinal axis 44 such that the arm 22 and the arm 32 are adjacent (i.e., near or close to each other) over an overlap distance D1. In an embodiment, the overlap distance D1 may be measured from the end 24 of the arm 22 of the waveguide core 12 to the transition from the bend 28 to the arm 32 of the waveguide core 14. The arm 40 of the waveguide core 16 is also longitudinally offset from the arm 22 of the waveguide core 12 parallel to the longitudinal axis 44 such that the arm 22 and the arm 40 are adjacent over an overlap distance D2. In an embodiment, the overlap distance D2 may be measured from the end 24 of the arm 22 of the waveguide core 12 to the transition from the bend 36 to the arm 40 of the waveguide core 16. In an embodiment, the arm 22 includes a tapered section, the arm 32 includes a tapered section positioned adjacent to the tapered section of the arm 22 over the overlap distance D1, and the arm 40 includes a tapered section positioned adjacent to the tapered section of the arm 22 over the overlap distance D2. Optical coupling may occur over the overlap distance D1 between the arm 22 and the arm 32, and optical coupling may occur over the overlap distance D2 between the arm 22 and the arm 40.

In an embodiment, the overlap distance D1 is not equal to the overlap distance D2. In an embodiment, the overlap distance D1 may be greater than the overlap distance D2. In that regard, the arms 32, 40 may have respective longitudinal offsets relative to the arm 22 such that an overlap offset ΔD exists that is equal to a difference between the overlap distance D1 and the overlap distance D2. The difference between the overlap distances D1, D2 is effective to provide asymmetrical optical splitting from the waveguide core 12 to the waveguide cores 14, 16. For example, over the overlap offset ΔD, optical coupling may occur primarily between the arm 22 and the arm 32, and may be absent between the arm 22 and the arm 40. In an embodiment, the overlap distances D1, D2 may range from about two (2) micrometers to about ninety (90) micrometers. In an embodiment, the length L1 of the arm 22 may be greater than either of the overlap distances D1, D2. In an embodiment, the length L2 of the arm 32 may be greater than either of the overlap distances D1, D2. In an embodiment, the length L3 of the arm 40 may be greater than either of the overlap distances D1, D2.

The arm 22 is laterally spaced or displaced by a gap G1 from the arm 32 over the overlap distance D1 for which the arms 22, 32 have a side-by-side or juxtaposed relationship. The arm 22 is laterally spaced or displaced by a gap G2 from the arm 40 over the overlap distance D2 for which the arms 22, 40 have a side-by-side or juxtaposed relationship. In an embodiment, the gap G1 may be smaller than the gap G2. In an embodiment, the gap G1 may be equal to the gap G2 such that the arm 22 is laterally centered between the arm 32 and the arm 40. In an embodiment, the dimensions of the gaps G1, G2 may range from the ground rule minimum to about two (2) microns. Beyond the end 24 of the arm 22, the arms 32 and the arm 40 have a side-by-side or juxtaposed relationship with a gap that is greater than either gap G1 or gap G2. In an embodiment, the overlap distance D1 may be greater than the overlap distance D2, and the gap G1 may be smaller than the gap G2.

The asymmetry in the overlap distances D1, D2 differs from conventional optical power splitters in which the equivalent overlap distances are nominally equal within manufacturing dimensional tolerances. Adjustments to the overlap distances D1, D2 provide an unexpected parameter for adjusting the optical coupling ratio of the structure 10 in contrast to conventional optical power splitters. For example, the overlap offset ΔD and overlap distances D1, D2 may be used as parameters to adjust the strength of optical coupling through the amount of mode overlap to enable a desired, preferable, or optimum mode distribution profile to be selected, which is not available and/or unexpected in a conventional optical power splitter, where the overlap, and thus the optical coupling, occurs.

In addition, arbitrarily low splitting ratios may be achieved with minimal loss through selection of the overlap offset ΔD and overlap distances D1, D2 as compared to conventional optical power splitters, which may exhibit high losses for low splitting ratios. The ability to provide low splitting ratios may be due to a multi-step adiabatic transition provided by the arm offsets and, hence, more gradual adiabatic transitions for coupling between the arm 22 and arm 32 and coupling between the arm 22 and the arm 40.

Figure 3:
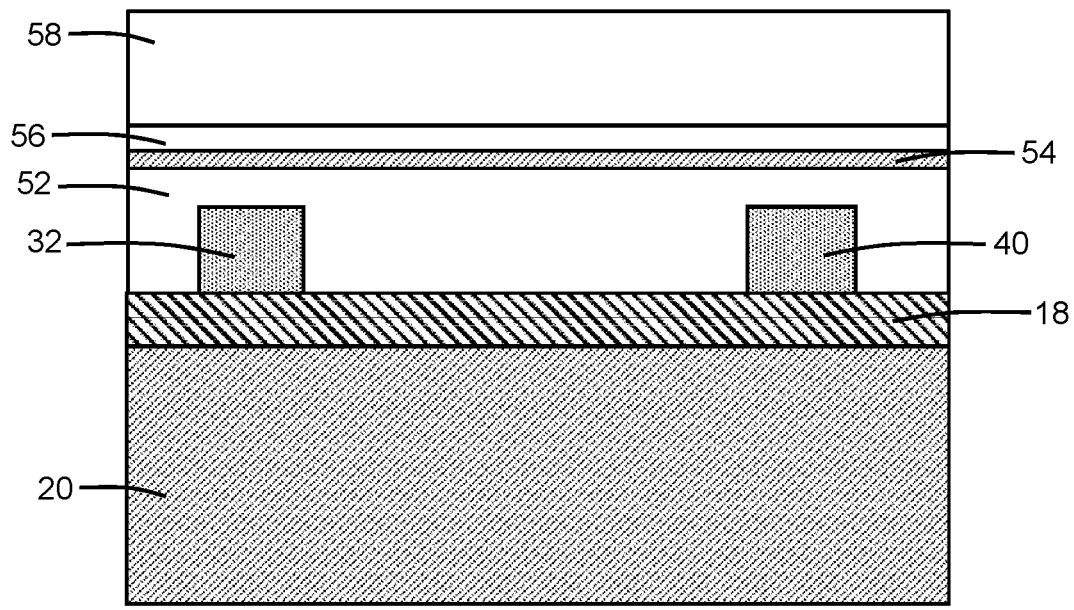
FIGS. 3, 3A are cross-sectional views of the structure at a fabrication stage of the processing method subsequent to FIGS. 2, 2A.
Figure 3A:
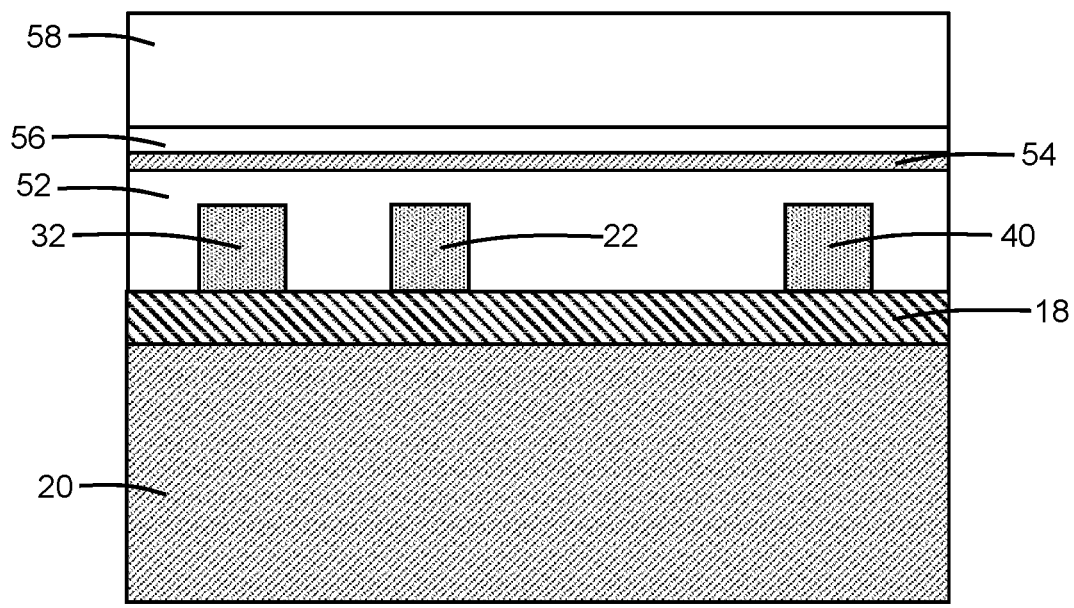

With reference to FIGS. 3, 3A in which like reference numerals refer to like features in FIGS. 1, 2, 2A and at a subsequent fabrication stage, additional dielectric layers 52, 54, 56 may be formed in a layer stack over the waveguide cores 12, 14, 16. The dielectric layer 54 may be comprised of silicon nitride, and the dielectric layers 52, 56 may be comprised of silicon dioxide. In an alternative embodiment, the dielectric layer 54 containing silicon nitride may be omitted from the layer stack. A back-end-of-line stack 58 may be formed by back-end-of-line processing over the dielectric layer 56. The back-end-of-line stack 58 may include one or more dielectric layers comprised of a dielectric material, such as silicon dioxide, silicon nitride, or a low-k dielectric material.

The structure 10, in any of its embodiments described herein, may be integrated into a photonics chip that may include electronic components and additional optical components. The electronic components may include, for example, field-effect transistors that are fabricated by CMOS processing using the device layer of the silicon-on-insulator substrate.

In use, laser light may be guided on the photonics chip by the waveguide core 12 from, for example, a fiber coupler or a laser coupler as input to the structure 10. The laser light is transferred in a distributed manner from the arm 22 of the waveguide core 14 to the arm 32 of the waveguide core 14 and to the arm 40 of the waveguide core 16. Specifically, the optical power of the laser light is divided or split by the structure 10 into different fractions or percentages that are transferred from the waveguide core 12 to the different waveguide cores 14, 16. The optical power of the laser light may be split unequally because the overlap between the arm 22 and the arm 32 (i.e., overlap distance D1) differs from the overlap between the arm 22 and the arm 40 (i.e., overlap distance D2) to provide the overlap offset ΔD. The waveguide cores 14 and 16 separately guide the split laser light away from the structure 10. The bends 34 of the waveguide cores 14 and the bends 42 of the waveguide core 16 increase the spacing downstream from the structure 10 to eliminate interaction and crosstalk between the split laser light that is output from the structure 10.

The structure 10 is capable of providing an arbitrary splitting ratio through the selection of the longitudinal offset of the arm 32 and the longitudinal offset of the arm 40 relative to the arm 22. The widths W1, W2, W3 of the arms 22, 32, 40, the gap G1 between the arm 22 and the arm 32, and the gap G2 between the arm 22 and the arm 40 may be used to tune the splitting ratio established by the longitudinal offsets. The structure 10 may be more intolerant to dimensional inaccuracies produced by fabrication variations, which may lead to reduced variability in the splitting ratio among different fabricated instances of the structure 10. The increased fabrication tolerance may be beneficial as the dimensions for the arms 22, 32, 40 shrink, which may be particularly relevant for splitting laser light in the O-band of wavelengths (e.g., 1260 nanometers to 1360 nanometers). The bend 28 on the input side of the arm 32 and the bend 36 on the input side of the arm 40 may reduce return loss and permit more efficient mode evolution.

In the representative embodiment, the waveguide core 12 defines an input port to an optical power splitter, the waveguide core 14 defines an output port from the optical power splitter, and the waveguide core 16 defines another output port from the optical power splitter. In an alternative embodiment in which laser light is combined by the structure 10, the waveguide core 12 may define an output port from an optical power combiner, the waveguide core 14 may define an input port to the optical power combiner, and the waveguide core 16 defines another input port from the optical power combiner.

Figure 4:
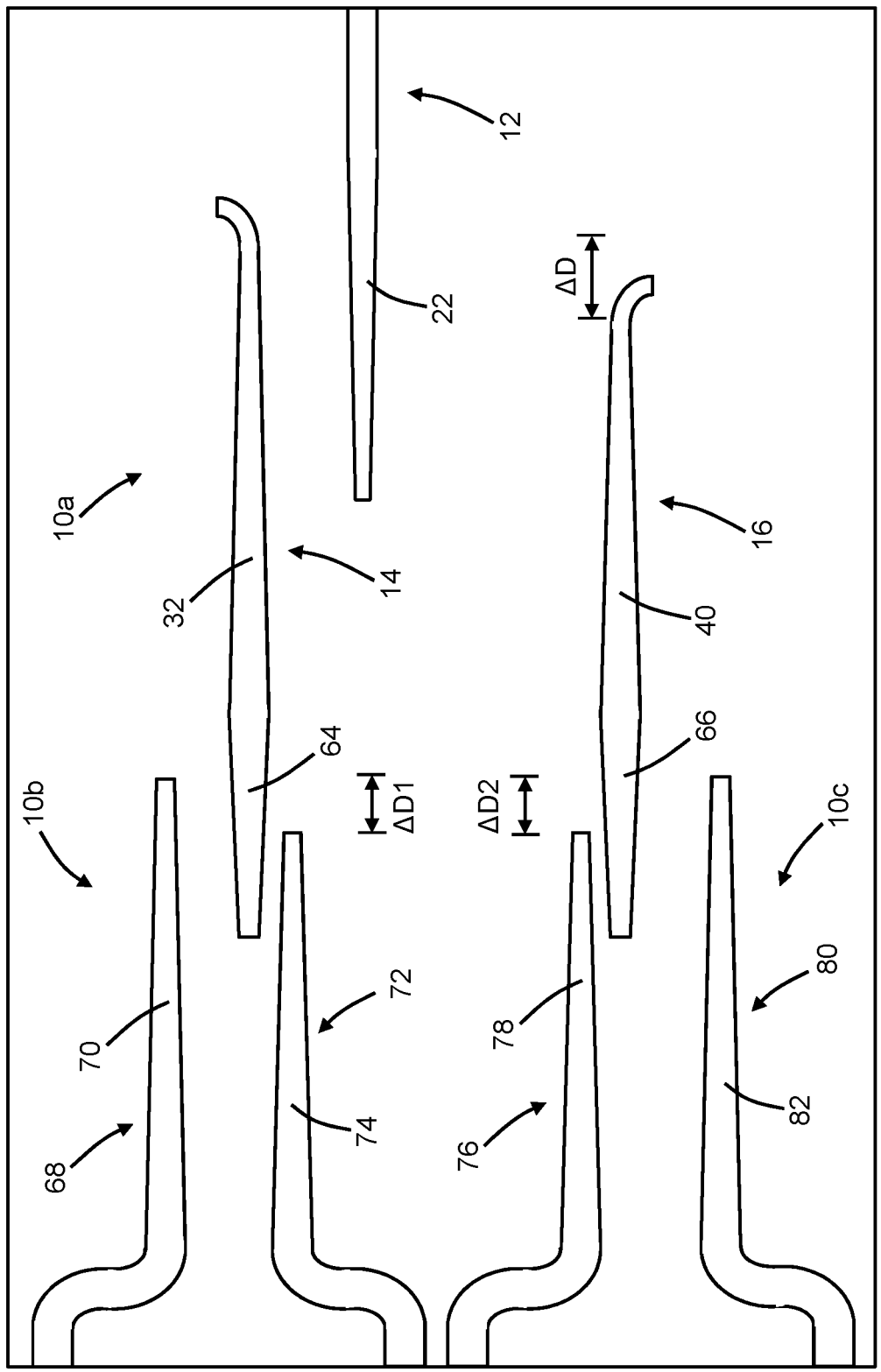
FIG. 4 is a top view of a structure in accordance with alternative embodiments of the invention.

With reference to FIG. 4 and in accordance with alternative embodiments of the invention, the structure 10 has a one input by two output (1×2) trident configuration when configured as an optical power splitter. In general, multiple instances M of the structure 10 may be cascaded to provide an arbitrarily chosen distribution of optical powers among M+1 outputs.

For example, multiple instances 10a, 10b, 10c of the structure 10 may be cascaded to provide a 1×4 optical power splitter. For the instance 10a of the structure 10, the waveguide core 14 includes a tapered section 64 that is adjoined to the arm 32, and the waveguide core 16 includes a tapered section 66 that is adjoined to the arm 40. The tapered section 64 terminates the arm 32 and provides an arm of the instance 10b of the structure 10. The tapered section 66 terminates the arm 40 and provides an arm of the instance 10c of the structure 10. In an embodiment, the input-side bends 28, 36 may be omitted from the instances 10b, 10c of the structure 10.

The instance 10b of the structure 10 includes a waveguide core 68 having an arm 70 and a waveguide core 72 having an arm 74. The tapered section 64 is laterally positioned between the arm 70 and the arm 74. The arms 70, 74 may have respective longitudinal offsets relative to the tapered section 64 such that an overlap offset ΔD1 is present due to different overlap distances of adjacency.

The instance 10c of the structure 10 includes a waveguide core 76 having an arm 78 and a waveguide core 80 having an arm 82. The tapered section 66 is laterally positioned between the arm 78 and the arm 82. The arms 78, 82 may have respective longitudinal offsets relative to the arm provided by the tapered section 66 such that an overlap offset ΔD2 is present due to different overlap distances of adjacency.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first waveguide core including a first arm;
   a second waveguide core including a second arm; and
   a third waveguide core including a third arm laterally positioned between the first arm and the second arm, the third arm having a longitudinal axis,
   wherein the first arm is longitudinally offset from the third arm parallel to the longitudinal axis such that the third arm and the first arm are laterally adjacent over a first overlap distance, the second arm is longitudinally offset from the third arm parallel to the longitudinal axis such that the third arm and the second arm are laterally adjacent over a second overlap distance, the first overlap distance is greater than the second overlap distance to provide a first overlap offset, the third arm is transversely displaced from the first arm by a first gap over the first overlap distance, the third arm is transversely displaced from the second arm by a second gap over the second overlap distance, and the first gap is smaller than the second gap.

2. The structure of claim 1 wherein the third arm terminates at an end, and the first overlap distance and the second overlap distance are measured relative to the end of the third arm.

3. The structure of claim 2 wherein the third arm comprises a tapered section having a width dimension that tapers along the longitudinal axis and terminates at the end.

4. The structure of claim 3 wherein the first arm comprises a tapered section positioned adjacent to the tapered section of the third arm over the first overlap distance, and the second arm comprises a tapered section positioned adjacent to the tapered section of the third arm over the second overlap distance.

5. The structure of claim 4 wherein the tapered section of the first arm has a first length that is greater than the first overlap distance, the tapered section of the second arm has a second length that is greater than the second overlap distance, and the first length is greater than the second length.

6. The structure of claim 3 wherein the tapered section of the first arm has a longitudinal axis that is aligned parallel to the longitudinal axis of the third arm, and the tapered section of the second arm has a longitudinal axis that is aligned parallel to the longitudinal axis of the third arm.

7. The structure of claim 1 wherein the first waveguide core defines a first output port from an optical power splitter, the second waveguide core defines a second output port from the optical power splitter, and the third waveguide core defines an input port to the optical power splitter.

8. The structure of claim 1 wherein the first waveguide core, the second waveguide core, and the third waveguide core comprise silicon.

9. The structure of claim 1 wherein the first waveguide core, the second waveguide core, and the third waveguide core comprise silicon nitride.

10. A structure comprising:
    a first waveguide core including a first arm and a first bend that terminates the first arm;
    a second waveguide core including a second arm and a second bend that terminates the second arm; and
    a third waveguide core including a third arm laterally positioned between the first arm and the second arm, the third arm having a longitudinal axis,
    wherein the first arm is longitudinally offset from the third arm parallel to the longitudinal axis such that the third arm and the first arm are laterally adjacent over a first overlap distance, the second arm is longitudinally offset from the third arm parallel to the longitudinal axis such that the third arm and the second arm are laterally adjacent over a second overlap distance, the first overlap distance is greater than the second overlap distance to provide a first overlap offset, the first arm comprises a tapered section that extends to the first bend, and the second arm comprises a tapered section that extends to the second bend.

11. The structure of claim 10 wherein the third arm comprises a tapered section that terminates at an end, the first overlap distance and the second overlap distance are measured relative to the end of the tapered section of the third arm, the first bend is positioned adjacent to the tapered section of the third arm, and the second bend is positioned adjacent to the tapered section of the third arm.

12. The structure of claim 1 wherein the third arm comprises a tapered section having a length, the length of the tapered section is greater than the first overlap distance, and the length of the tapered section is greater than the second overlap distance.

13. The structure of claim 1 wherein the first arm comprises a tapered section, the second arm comprises a tapered section, the third arm comprises a tapered section having a width dimension that tapers along the longitudinal axis, the tapered section of the first arm is positioned adjacent to the tapered section of the third arm over the first overlap distance, and the tapered section of the second arm is positioned adjacent to the tapered section of the third arm over the second overlap distance.

14. A structure of claim 1 comprising:
    a first waveguide core including a first arm and a tapered section adjoined to the first arm;
    a second waveguide core including a second arm and a second bend that terminates the second arm; and
    a third waveguide core including a third arm laterally positioned between the first arm and the second arm, the third arm having a longitudinal axis
    a fourth waveguide core including a fourth arm; and
    a fifth waveguide core including a fifth arm,
    wherein the first arm is longitudinally offset from the third arm parallel to the longitudinal axis such that the third arm and the first arm are laterally adjacent over a first overlap distance, the second arm is longitudinally offset from the third arm parallel to the longitudinal axis such that the third arm and the second arm are laterally adjacent over a second overlap distance, the first overlap distance is greater than the second overlap distance to provide a first overlap offset, the tapered section of the first waveguide core is laterally positioned between the fourth arm and the fifth arm, the fourth arm is longitudinally offset from the tapered section such that the fourth arm and the tapered section are adjacent over a third overlap distance, the fifth arm is longitudinally offset from the tapered section such that the fifth arm and the tapered section are adjacent over a fourth overlap distance, and the third overlap distance is greater than the fourth overlap distance to provide a second overlap offset.

15. The structure of claim 1 wherein the first waveguide core includes a first bend that terminates the first arm, and the second waveguide core includes a second bend that terminates the second arm.

16. The structure of claim 15 wherein the first arm comprises a tapered section that extends to the first bend, and the second arm comprises a tapered section that extends to the second bend.

17. The structure of claim 1 wherein the first waveguide core includes a tapered section adjoined to the first arm, and further comprising:
   a fourth waveguide core including a fourth arm; and
   a fifth waveguide core including a fifth arm,
   wherein the tapered section of the first waveguide core is laterally positioned between the fourth arm and the fifth arm, the fourth arm is longitudinally offset from the tapered section such that the fourth arm and the tapered section are adjacent over a third overlap distance, the fifth arm is longitudinally offset from the tapered section such that the fifth arm and the tapered section are adjacent over a fourth overlap distance, and the third overlap distance is greater than the fourth overlap distance to provide a second overlap offset.

18. The structure of claim 10 wherein the first waveguide core defines a first output port from an optical power splitter, the second waveguide core defines a second output port from the optical power splitter, and the third waveguide core defines an input port to the optical power splitter.

19. The structure of claim 10 wherein the first waveguide core, the second waveguide core, and the third waveguide core comprise silicon.

20. The structure of claim 10 wherein the first waveguide core, the second waveguide core, and the third waveguide core comprise silicon nitride.

* * * * *